Aug. 26, 1941.  R. H. BOUND  2,253,680
BILATERALLY SUPPORTED RESILIENT WHEEL MOUNTING
FOR AIRCRAFT UNDERCARRIAGES
Filed May 12, 1939  2 Sheets-Sheet 1

Inventor:
Rowland H. Bound
By Charles L. Reynolds
Atty.

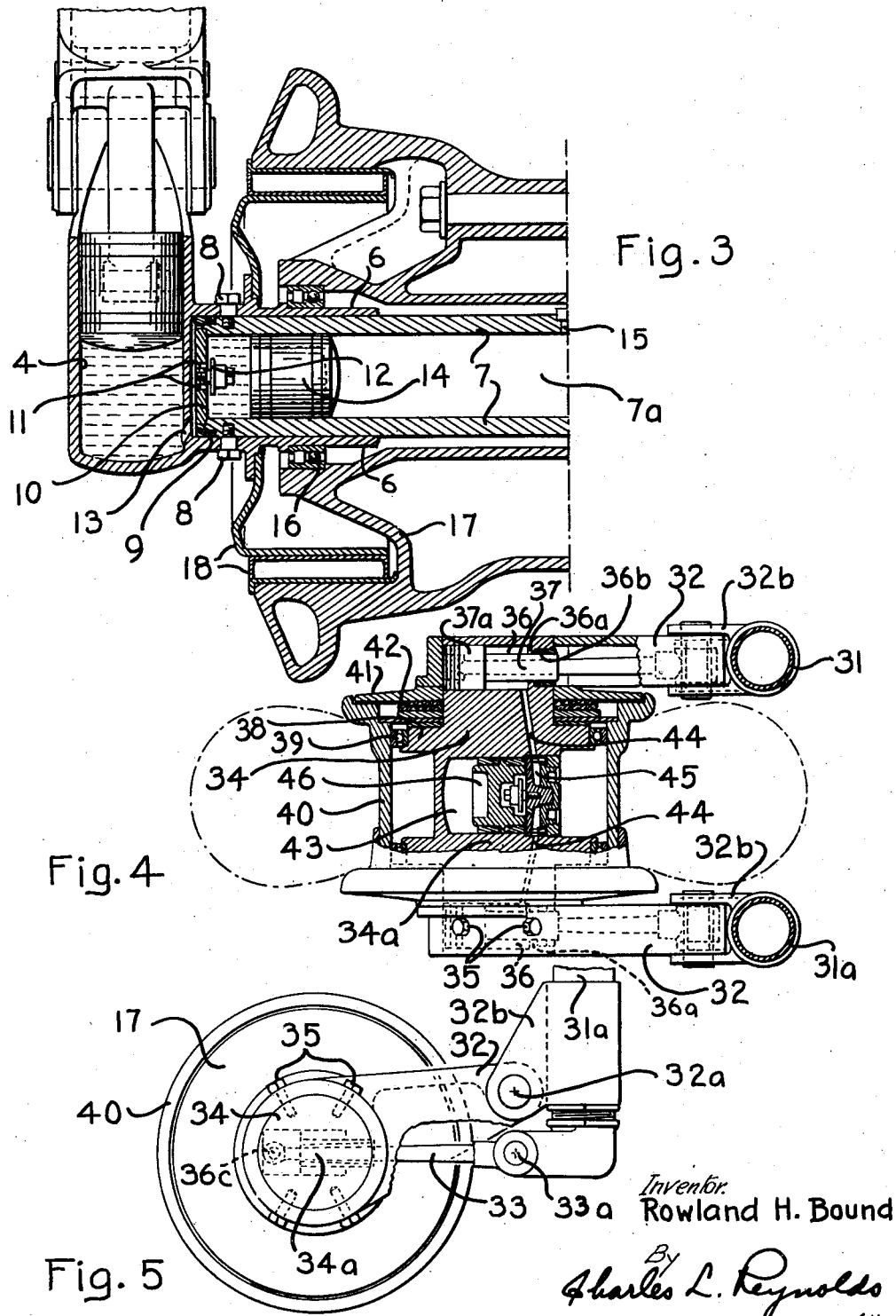

Patented Aug. 26, 1941

2,253,680

UNITED STATES PATENT OFFICE 2,253,680

BILATERALLY SUPPORTED RESILIENT WHEEL MOUNTING FOR AIRCRAFT UNDERCARRIAGES

Rowland Henry Bound, Cheltenham, England, assignor to Dowty Equipment Limited, a limited company Application May 12, 1939, Serial No. 273,241
In Great Britain May 27, 1938

16 Claims. (Cl. 244—104)

This invention relates to aircraft undercarriages or alighting gear, and more particularly to a resilient wheel mounting therefor, that is, one in which a wheel is attached to the aircraft through the medium of a shock-absorbing mounting unit which transmits all the landing loads from the wheel to a substantially rigid undercarriage structure, including normally an upright leg or legs, or like strut means.

The present invention is, more particularly, in the nature of an improvement upon and extension of the invention disclosed in the Patent No. 2,174,315 of George Herbert Dowty, issued September 26, 1939.

It is one of the advantages of the prior construction referred to above that a wheel mounting, incorporating a shock absorber means, could be formed as a unit, adapted for use under widely varying conditions and to absorb widely different loads, and was capable of being attached in a simple manner to various types of strut means, so that the structure lent itself admirably to quantity production, in that it was capable of use under such widely varying circumstances and with widely different structure, and where the loads or operating conditions might vary materially. It is an object of the present invention to retain the advantages of the former construction to the full, and indeed to increase such advantages or to widen their scope by providing a unit which is adaptable to service under still wider variations in conditions. In particular it is an object of the present invention to devise a structure of the general type indicated, which may be applicable where, for conditions of convenience, design, strength or otherwise, it may be desirable to support the ground-engaging member from two separate strut means, or by two independent supporting structures.

More particularly it is an object of the present invention, where such a dual or bilateral support for the ground-engaging member is desired, to provide means whereby the resistance of the semi-independent shock absorbing units may be equalized, so that equal reactions are produced between the support of the ground-engaging member at each side and the strut means or other undercarriage support, and whereby the load is thus balanced or equally distributed.

It is a further object to provide such a structure which, notwithstanding its range of usefulness, may be made lighter in weight and at less cost, and which may be more easily constructed, more readily maintained, and which will have improved wearing qualities.

With these and other objects in mind, as will appear hereafter, my invention comprises the novel parts, and the novel combination and arrangement thereof, relative to each other and relative to the other parts of the aircraft undercarriage, as shown in the accompanying drawings, described in this specification, and as will be more particularly defined by the claims which terminate the same.

In the accompanying drawings the invention is shown in forms which are at present preferred, and which are believed to be illustrative of the principles of the invention, without any intention, however, of restricting the invention to embodiments in the forms shown.

Figure 3 is a section substantially on the line A—B of Figure 1, and drawn to a larger scale, illustrating one of the two symmetrical halves of this form of the invention.

Figure 4 is an axial section, and Figure 5 is a side view, of another embodiment of the invention.

Figure 1:
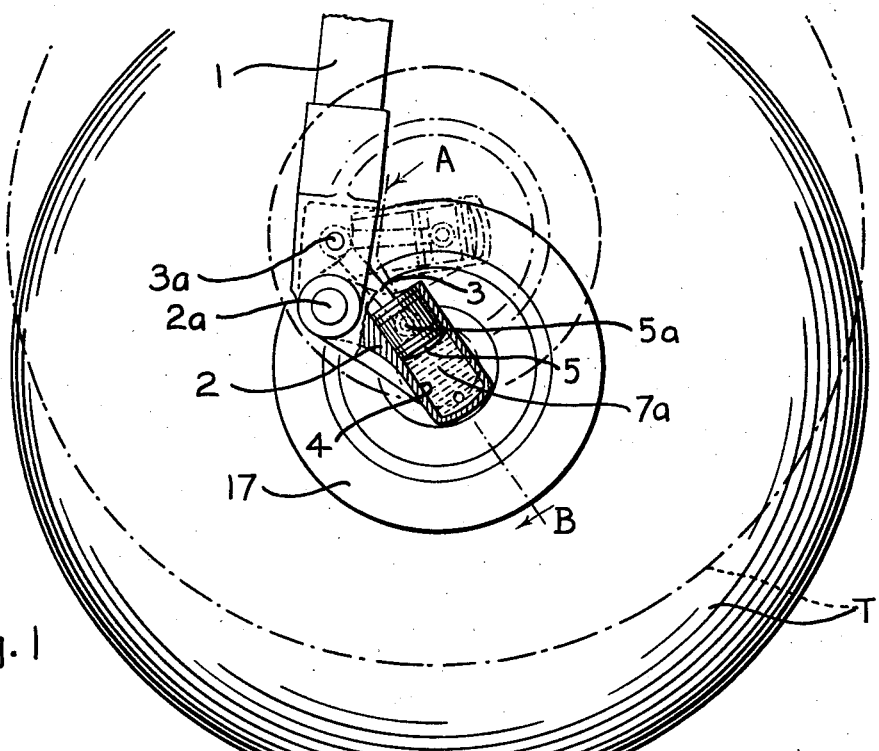
Figure 1 is a side elevation of one form of the invention, with parts in section.

It will be noted that, for the sake of convenience, reference is hereafter made to a wheel, as typical of a ground-engaging member. However, the term "wheel," unless the context precludes, is intended to include specifically different landing elements, such, for instance, as a ski or a float. Normally, but not in all cases necessarily, the landing element contemplated is such as will be or can be mounted on a spindle transverse to the direction of movement of the aircraft, which by being journaled upon such spindle may be permitted to rotate or tilt angularly in the plane of the track of the wheel or other landing element.

The present invention is concerned only with units in which the wheel is supported bilaterally, that is, by a substantially symmetrical arrangement on the two sides of its plane of rotation, which is the plane containing its track, and in which there is equalization as between the supporting means on the opposite sides of the wheel.

The undercarriage structure is not, per se, a part of the present invention. It may be fixed or retractable, but in either case, in the operative or landing position it is rigidly dependent from the aircraft. Herein it is represented only by a pair of upright legs 1, 1a. These legs would be connected or cross braced in a known manner to form a frame of which the ground plane is transverse to the landing direction, and to the track of the wheel 17 and tire T, supported from the legs 1 and 1a. The arrangement of the parts being substantially symmetrical about the plane of rotation of the wheel (the line A—A in Figure 2), the details thereof will, as far as possible, be described in the singular, it being understood, however, that the details described are purely illustrative. The legs are shown as forked at the lower extremities. Embraced by the fork of the leg 1 and pivotally mounted on the axis 2a is an arm 2, and likewise embraced and pivotally mounted on the axis 3a is an arm or link 3. The axes 2a and 3a are spaced apart vertically, and are parallel to each other and to the ground. The wheel 17, by structure described later, may be considered as supported from the arm 2 upon an axis 7a.

The arm 2 is formed with an internal cylinder 4, of which the axis is lengthwise in relation to the arm 2, and offset in relation to the axis 2a, being in part directed so as to intersect the axis 3a in one working position of the device. In the cylinder 4 slides a shock absorber piston 5 pivotally connected to the outer end of the link 3 by a gudgeon pin 5a, and the cylinder 4 is filled with a fluid (a liquid) which is acted upon and compressed and displaced by movement of the working piston 5 within the cylinder 4.

The link 3 and piston 5 may be considered as, in effect, one arm, and the arm 2 is a second arm; these two arms are supported upon the upright leg 1 at points 2a and 3a spaced one above the other, and are connected together in effect at the point 7a, the whole constituting a triangular wheel-supporting frame. These two arms are in effect interconnected at their swinging ends to require that they swing together (though by means giving effect to the movement of the piston 5 in its cylinder 4), hence this triangular wheel support is deformable. Each such arm extends generally laterally, so that when their outer or swinging end is displaced upwardly by contact of the wheel with the ground the arms move generally upwardly, but one moves lengthwise of the other, by reason of the relative angular displacement. When the arm 2 is moved upward from the full line to the dash line position, the piston 5 must obviously displace liquid from the cylinder 4, and by means which will be described hereafter such displacement is resisted. The deformation of the triangular frame, thus constituted, may be resisted by the piston and cylinder acting as a shock absorber unit, in conjunction with the fluid flow regulating devices, as is common in such shock absorbers.

Carried at the swinging end of the interconnected arms thus described is a spindle which extends transversely, and which interconnects the two identical and identically mounted shock absorber units at opposite sides of the wheel 17, such spindle including or defining the axis 7a, and constituting the immediate support for the wheel 17. Thus the arm 2 may be formed with an integral laterally extending socket part 6 (see Figure 3), into which is fitted one end of a cylindrical tubular spindle 7, secured by studs 8 or by other suitable means. In the end of the spindle 7 is fixed a plate 10, which is perforated by ports 11 cooperating with a well known type of check or damping valve 12, which constitutes the flow-controlling means of the shock absorber. A duct 13 runs from the outer end of the cylinder bore for the transfer of liquid into the interior of the socket 6 and thus against the plate 10, through the ports 11 of which this liquid may pass subject to the restrictions due to the valve 12.

Within the chamber formed within the hollow spindle 7, which chamber is preferably cylindrical, and into the ends of which the liquid is displaced from each of the two shock absorbers, is disposed a pair of pistons 14, one at each end of the chamber 7. These floating or idle pistons 14 separate the fluid entering past the valve 12, and the fluid, usually compressed air or gas, located within the chamber 7 and between the pistons 14. Thus these pistons 14 may be urged apart by compressed air introduced between them by a valved connection 15, an end of which may be brought to an accessible position, whereby the initial pressure within the chamber 7 may be governed or controlled, and whereby the pressure may be varied from time to time to accommodate varying conditions of operation. The pistons 14 are merely idle or floating pistons, which separate the liquid from the air, and which have substantially no pressure differential across them.

The spindle 7, as will be seen, interconnects and spans the distance between the shock absorber units, comprising the respective arms of the deformable triangles. Upon the spindle, or rather upon the sockets 6, which for this purpose virtually form part of the spindle, are bearings 16 for the landing wheel 17. Fixed to the sockets 6, and thus directly to the arms 2, are the non-rotating parts, represented at 18, of bilateral wheel brakes.

In fitting or removing the wheel 17 the studs 8 are extracted and one socket 6 is removed from the spindle 7, the bearing 16 and brake parts 18 on that side coming apart automatically, as it were. The wheel is then free to be removed. To do this the pins on the axes 2a and 3a at one side of the wheel are first removed.

The construction described above will be seen to lend itself to a high degree of standardization of parts, and to a wide range of adaptability without interchange of parts, merely by adjustments to adapt the structure to different or to changed conditions. For example, the whole wheel mounting, back to the legs 1, 1a, considered as a unit, may be applicable to aircraft of different types, and wheels of different axial breadth may be used by varying the length of the spindle 7. It will also be appreciated that the pressure in the twin bilateral shock absorber units must be uniform, since it is attributable to the mutually effective pressure of the air between the pistons 4. By thus interconnecting the two shock absorber units through the spindle 7, and through the equalizing chamber therein, the forces reacting through the two shock absorber units are equalized. Not only is equalization obtained, by air pressure or by equivalent mechanical means, but the equalizing connection is not exposed and external, requiring special fittings, and interfering with the operation and servicing of other parts of the whole wheel mounting, but on the contrary, by this invention the equalizing connection is wholly internal, built-in, and clear of all other parts.

Figure 2:
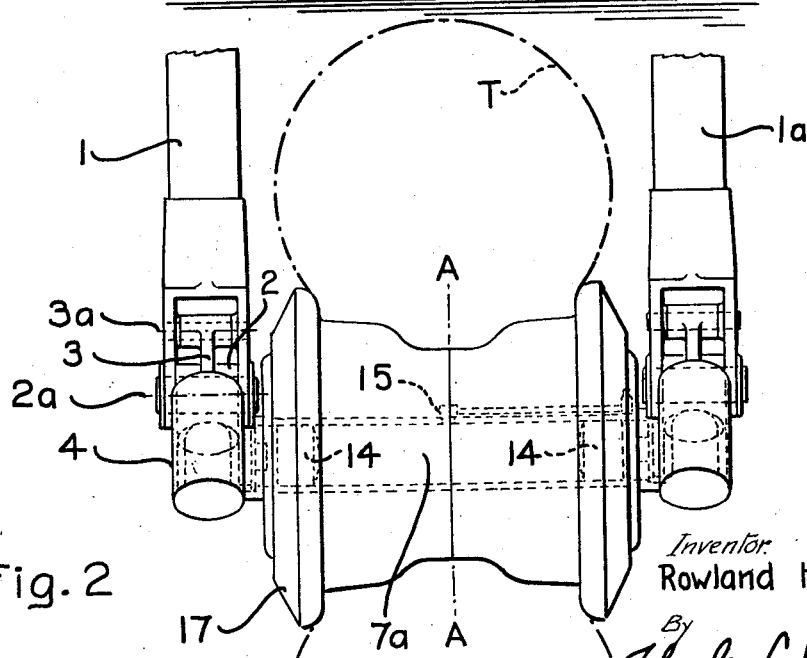
Figure 2 is a front elevation thereof.

The construction shown in Figures 4 and 5 incorporates the same broad features. By way of comparison, while the arms of the triangle in Figures 1 and 2 are compressed by upward loads on the wheel, in Figures 4 and 5 the corresponding arms are in tension in those circumstances. This necessitates a rearrangement of the corresponding piston. Also, as will be seen, the equalizing chamber in Figure 4 is not disposed axially of the spindle, as in the form first described, but is now transverse relative to the spindle's axis. Preferably its axis is parallel to the ground. The same degree of symmetry existing in Figure 4 as in the form previously described, the description will again be stated, as far as practicable, in the singular.

The legs 31, 31a of the undercarriage are again substantially rigid, parallel and spaced apart transversely. On the leg 31 is mounted a forked fitting 32b with a pin joint on axis 32a for an arm 32. A second leg fitting, preferably adjustably attached to the leg, has a pin joint on axis 33a for a second arm or link 33. The arm 32 encircles at its outer end a spindle 34, the two arms 32 at opposite sides of the wheel and the spindle being rigidly interattached, as by studs 35.

In each end of the spindle 34 is formed a diametrically disposed cylinder 36, with an internal flange at 36a forming in effect an annular cylinder head. In the cylinder 36 slides a piston head 37a, formed on a hollow piston 37, of which the shank part (of less diameter than the head 37a) slides through the flange 36a and through a packing gland 36b. The pressure space, swept by the piston, is thus the space between the head 37a and the flange 36a, and is annular. The crown of the piston is left open, as also the corresponding end of the cylinder 36 is left open, except in that it is encircled by part of the arm 32. In the piston, practically at the crown thereof, is a gudgeon pin 36c, pivotally connecting the link 33 with the piston. The link 33 thus extends almost completely through the piston, and the interior bore of the piston is somewhat internally tapered in shape to allow the link 33 a certain required angular freedom. The cylinder 36 is filled with liquid.

The spindle 34 the axis whereof is indicated at 34a, has a radially extending integral flange 38, which supports one of the two wheel bearings 39 for the wheel 40. An annular cover plate 41 (attached to the arm 32) and surrounding the spindle 38 carries stationary brake parts 42 of an axially operating brake mechanism. Since the brakes are twin and operate oppositely on the wheel no special provision of thrust bearings is required to meet brake loads axially.

In the central part of the spindle 34, that is, between the flanges 38, there is formed a cylindrical chamber 43. In the form shown, and preferably, this chamber 43 has its axis disposed diametrically with reference to the spindle. A duct 44 connects one end of the chamber 43 to the cylinder 36 for liquid flow, and each of the cylinders 36 is connected to a common end of the chamber 43. In the chamber 43, and further within it than the opening of the duct 44, is a fixed plate 45 with ports therethrough, and a damping valve, substantially as in the example of Figures 1, 2 and 3. Still further within the chamber 43 is an idle or floating piston 46 separating liquid from the fluid (compressed air) which the piston confines in the far end of the chamber 43. A valved conduit is provided (not shown) for introducing and varying the compression of the compressed air.

The operation of the device is similar to that already described. Upward landing load on the wheel 40 rocks the arms 32 each about the common axis 32a, and this requires that the piston 37a slide within and displace liquid from the cylinders 36 through the ducts 44 into the chamber 43, behind the piston 46, the liquid being checked by the valved ports and resisted by the compressed air on the opposite side of the piston. Upon relaxation of this load the air reasserts itself to expel the liquid back into the cylinders 36, subject to the resistance of the ports and valve, which force this sense of flow is arranged to be greater (to damp the recoil) in a known manner.

In this example again it is seen that the resilient resistance of the twin bilateral shock absorber units is equalized by virtue of the mutually effective equalizing chamber, filled, for instance, with compressed air.

In both examples it is to be understood that the two arms which directly support the spindle, and the two cooperating arms or links which cooperate therewith to constitute the deformable triangle, are each respectively coaxial, that is, the axis 2a or 32a is common to both sides of the arrangement, as is also the axis 3a or 33a. Also it is to be understood that these axes are substantially parallel with the axis 7a or 34a of the spindle in each case, and therefore the wheel rises and falls in a plane which includes its track. The whole of the loads required to be transmitted between the wheel and the aircraft, including brake torque reaction, is transmitted through the arms and links.

The undercarriage legs are described as rigid, and so they may be, and normally would be, formed. However, there is nothing in the structure of the resilient wheel, including the shock absorber unit, to preclude its use in undercarriages which have resilient upright legs, or which are otherwise yieldable in themselves. The resilient wheel mounting is then cumulative or additive in its effect, and by ready adjustment may be made to cooperate most effectively with a resilient undercarriage.

While the arrangements shown and described are desirable, practicable, and preferred, the principles of this invention may be incorporated in widely varying forms and arrangements. The description, therefore, is to be regarded as primarily illustrative, and the invention is limited in its scope only to the extent required to conform to the following claims.

What I claim as my invention is:

1. In aircraft alighting gear, in combination, two upright legs, a spindle disposed transversely to the direction of advance, and parallel to the ground, whereon a wheel or like ground-engaging member is journaled, an arm pivoted upon and extending generally laterally from each of said legs, the spindle extending between and being supported wholly by the swinging ends of said arms, a second arm pivotally supported from each leg, and extending generally laterally from a point thereon which is spaced from the pivot of the first arm, and each paired with one of such first arms and linked to the swinging end thereof to swing jointly therewith, and to form a deformable triangle, each such triangle including a piston carried by one arm and a cylinder carried by the other, and a pressure-equalizing connection extending through the spindle between the pressure chamber of each such cylinder.

2. In aircraft alighting gear, in combination, two upright legs disposed side by side, two arms each pivotally connected to one of said upright legs at points spaced one above the other, and both arms extending generally laterally, means interconnecting the swinging ends of said arms to constrain them to swing together, and to constitute, with the leg, a deformable triangle, a cylinder operatively connected to one such arm and a piston operatively connected to the other, and movable within the cylinder to create pressure therein by deformation of the triangle, duplicate elements constituting a second deformable triangle identical to the first and identically connected to the second upright leg, a spindle supported solely by and swingable with the swinging ends of said arms, a pressure equalizing connection between the pressure chambers of each such cylinder, extending through the spindle, and a ground-engaging member supported by the spindle, to effect upward movement thereof upon landing.

3. In aircraft alighting gear, in combination, two upright legs disposed side by side, two arms each pivotally connected to one of said upright legs at points spaced one above the other, means interconnecting the swinging ends of said arms to constrain them to swing together, and to constitute, with the leg, a deformable triangle, duplicate arms constituting an identical deformable triangle identically connected to the second upright leg, a transverse spindle connecting the swinging ends of the arms constituting the two triangles, a ground-engaging member carried by said spindle, to effect upward swinging of the arms, and deformation of the triangles, upon landing, and means operatively connected to each triangle to create pressure, upon such deformation, resisting the same, and means acting through the spindle to equalize the forces of resistance as applied to the two triangles.

4. In aircraft alighting gear, in combination, upright strut means, a ground-engaging member, two independent means disposed at opposite sides of the ground-engaging member and supporting the same for movement relative to the strut means under the influence of forces incident to landing or taxying, means operatively connected between the ground-engaging member and the strut means to yieldingly resist such movement, and means operatively connected between the yieldable means and the respective supporting means, and through the ground-engaging member, to equalize the forces of resistance as between the two supporting means.

5. In aircraft alighting gear, in combination, upright strut means, a transverse spindle, a ground-engaging member journaled upon said spindle, two independent means operatively engaged with the opposite ends of the spindle and supporting the same for movement relative to the strut means under the influence of forces incident to landing or taxying, means operatively connected between the spindle and the strut means to yieldingly resist such movement, and means operatively connected, through the spindle between the yieldable means and the respective supporting means to equalize the forces of resistance as between the two supporting means.

6. In aircraft alighting gear, in combination, upright strut means, a ground-engaging member, two independent means disposed at opposite sides of the ground-engaging member and supporting the same for movement relative to the strut means under the influence of forces incident to landing or taxying, means, including a piston movable within a fluid-filled cylinder, operatively connected between each supporting means and the strut means to yieldingly resist such movement, and means operatively connected between the two cylinders, and subject to the pressure in both, and through the ground-engaging member, to equalize the forces of resistance as between the two supporting means.

7. In aircraft alighting gear, in combination, upright strut means, a ground-engaging member, two independent means disposed at opposite sides of the ground-engaging member and supporting the same for movement relative to the strut means under the influence of forces incident to landing or taxying, means, including a piston movable within a fluid-filled cylinder, operatively connected between each supporting means and the strut means to yieldingly resist such movement, and an air-filled cylinder operatively connected, through the ground-engaging member, to both of the fluid-filled cylinders, and subject to pressure in both, to equalize the fluid resistance reacting through the respective fluid-filled cylinders.

8. In aircraft alighting gear, in combination, upright strut means, a transverse spindle, a ground-engaging member carried by said spindle, two independent means operatively engaged with the opposite ends of the spindle and supporting the same for movement relative to the strut means under the influence of forces incident to landing or taxying, means, including a piston movable within a fluid-filled cylinder, operatively connected between each supporting means and the strut means to yieldingly resist such movement, and a fluid-filled chamber disposed substantially wholly within the spindle, operatively connected to both the fluid-filled cylinders, and subject to the pressure therein, to equalize the fluid resistance reacting through the respective cylinders.

9. The combination of claim 8, wherein the equalizing chamber is substantially cylindrical and coaxial with the spindle, and communicates at its opposite ends with the respective cylinders, and two floating pistons in the respective ends of and movable axially within the equalizing chamber, separating the fluid within the cylinders from the fluid within the chamber, between the two floating pistons.

10. The combination of claim 8, wherein the equalizing chamber is substantially cylindrical and coaxial with the spindle, and communicates at its opposite ends with the respective cylinders, and two floating pistons in the respective ends of and movable axially within the equalizing chamber, separating the fluid within the cylinders from the fluid within the chamber, between the two floating pistons, and means to compress and to vary at will the initial compression of the fluid between the floating pistons.

11. The combination of claim 8, wherein the equalizing chamber is substantially cylindrical, and is disposed transversely of the spindle's axis, the spindle being formed with passages extending from each fluid-filled cylinder to a common end of the equalizing chamber, and a floating piston within the equalizing chamber, and movable axially thereof under the influence of fluid pressure upon one face, against the resistance of pressure imparted to the fluid within the chamber at its opposite face.

12. The combination of claim 8, wherein the equalizing chamber is substantially cylindrical, and is disposed transversely of the spindle's axis, the spindle being formed with passages extending from each fluid-filled cylinder to a common end of the equalizing chamber, a floating piston within the equalizing chamber, and movable axially thereof under the influence of fluid pressure upon one face, against the resistance of pressure imparted to the fluid within the chamber at its opposite face, and means to initially compress and to vary at will the initial compression of the latter fluid medium.

13. An aircraft wheel mounting comprising, in combination, a pair of spaced-apart liquid-filled piston-and-cylinder shock absorber units, a wheel spindle extending between and supported by the to units, the two units being organized and arranged to displace liquid upon upward yielding of the spindle, an equalizing chamber disposed within the spindle, means associated with said chamber to afford a resilient resistance to displacement of liquid thereinto, said chamber being operatively connected to each of the two units to receive displaced liquid therefrom, to equalize the resistance afforded by the two units.

14. An aircraft wheel mounting as in claim 13, including, as the means to afford resilient resistance to liquid displacement, means to fill the equalizing chamber with a resilient compressible fluid, and to vary the initial compression thereof.

15. In aircraft alighting gear, in combination, two upright legs disposed side by side, two arms each pivotally connected to one of said upright legs at points spaced one above the other a lesser distance than the length of either arm, and both arms extending generally laterally, means interconnecting the swinging ends of said arms to constrain them to swing together, and to constitute, with the intervening portion of the leg, a deformable triangle, of which the leg portion is the shortest side, duplicate arms identically connected to the second leg, and with the intervening portion thereof constituting an identical deformable triangle, a ground-engaging member, a support for the ground-engaging member including a transverse element extending between corresponding arms of the two triangles, at their swinging ends, rigid with both said arms and constituting the sole connection between them, to effect upward movement thereof, and deformation of the triangles, under the influence of ground loads, and a piston carried by one arm of each triangle and a cylinder carried by the other arm, and movable within its cylinder, to resist deformation of the respective triangles under ground loads, and to absorb the forces created thereby, and, through said rigidly connected transverse element, tending to equalize the resisting forces between the two cylinders.

16. In aircraft alighting gear, in combination, two upright legs disposed side by side, two arms each pivotally connected to one such leg, at points spaced one above the other a lesser distance than the length of either arm, and both arms extending generally laterally, means interconnecting the swinging ends of said arms to constrain them to swing together, and to constitute, with the intervening portion of the leg, a deformable triangle, of which the leg portion is the shortest side, duplicate elements constituting a second deformable triangle identically connected together and to the second upright leg, a ground-engaging member, a support for the ground-engaging member including a transverse element extending between corresponding arms of the two triangles, at their swinging ends, and rigid with both said arms, a cylinder carried by one arm of each triangle and a piston carried by the other arm and movable within its cylinder against resistance by deformation of the triangle, means associated with each cylinder and piston to resist deformation of both triangles, through the rigid interconnection afforded by said transverse element, under landing shocks, and to absorb the energy thereof, and a pressure equalizing connection between the pressure chambers of each cylinder, to absorb and equalize taxying loads.

ROWLAND HENRY BOUND.